US006772226B1

(12) United States Patent
Bommareddy et al.

(10) Patent No.: US 6,772,226 B1
(45) Date of Patent: Aug. 3, 2004

(54) VPN DEVICE CLUSTERING USING A NETWORK FLOW SWITCH AND A DIFFERENT MAC ADDRESS FOR EACH VPN DEVICE IN THE CLUSTER

(75) Inventors: Satish Bommareddy, San Jose, CA (US); Makarand Kale, Sunnyvale, CA (US); Srinivas Chaganty, San Jose, CA (US)

(73) Assignee: Avaya Technology Corp., Basking Ridge, NJ (US)

( * ) Notice: Subject to any disclaimer, the term of this patent is extended or adjusted under 35 U.S.C. 154(b) by 671 days.

(21) Appl. No.: 09/638,351

(22) Filed: Aug. 15, 2000

(51) Int. Cl.[7] .............................................. G06F 15/16
(52) U.S. Cl. ........................ 709/245; 709/250; 709/230
(58) Field of Search ................................ 709/245, 250, 709/230, 223, 224, 238, 239, 227

(56) References Cited

U.S. PATENT DOCUMENTS

| 5,283,897 | A |   | 2/1994  | Georgiadis et al. |
|-----------|---|---|---------|-------------------|
| 5,301,226 | A |   | 4/1994  | Olson et al.      |
| 5,473,599 | A |   | 12/1995 | Li et al. ........................ 370/16 |
| 5,513,314 | A |   | 4/1996  | Kandasamy et al.  |
| 5,583,940 | A |   | 12/1996 | Vidrascu et al.   |
| 5,586,121 | A |   | 12/1996 | Moura et al.      |
| 5,608,447 | A |   | 3/1997  | Farry et al.      |
| 5,612,865 | A |   | 3/1997  | Dasgupta          |
| 5,612,897 | A |   | 3/1997  | Rege              |
| 5,634,125 | A |   | 5/1997  | Li                |
| 5,652,892 | A |   | 7/1997  | Ugajin            |
| 5,655,140 | A |   | 8/1997  | Haddock           |
| 5,666,487 | A |   | 9/1997  | Goodman et al.    |
| 5,687,369 | A |   | 11/1997 | Li                |
| 5,740,375 | A |   | 4/1998  | Dunne et al.      |
| 5,754,752 | A |   | 5/1998  | Sheh et al.       |
| 5,764,895 | A |   | 6/1998  | Chung             |
| 5,774,660 | A |   | 6/1998  | Brendel et al.    |
| 5,774,668 | A |   | 6/1998  | Choquier et al.   |
| 5,796,941 | A |   | 8/1998  | Lita              |
| 5,805,804 | A |   | 9/1998  | Laursen et al.    |
| 5,812,819 | A |   | 9/1998  | Rodwin et al.     |
| 5,815,668 | A |   | 9/1998  | Hashimoto         |
| 5,828,833 | A |   | 10/1998 | Belville et al.   |
| 5,835,696 | A |   | 11/1998 | Hess              |
| 5,835,710 | A |   | 11/1998 | Nagami et al.     |
| 5,862,338 | A |   | 1/1999  | Walker et al.     |
| 5,864,666 | A |   | 1/1999  | Shrader           |
| 5,898,830 | A |   | 4/1999  | Wesinger, Jr. et al. |
| 5,920,699 | A |   | 7/1999  | Bare              |
| 5,936,936 | A |   | 8/1999  | Alexander, Jr. et al. |
| 5,949,753 | A |   | 9/1999  | Alexander, Jr. et al. |
| 5,951,634 | A |   | 9/1999  | Sitbon et al.     |
| 5,959,990 | A |   | 9/1999  | Frantz et al.     |
| 5,963,540 | A |   | 10/1999 | Bhaskaran         |
| 5,999,536 | A |   | 12/1999 | Kawafuji et al.   |
| 6,006,259 | A | * | 12/1999 | Adelman et al. ........... 709/223 |
| 6,006,264 | A | * | 12/1999 | Colby et al. ................ 709/226 |
| 6,078,957 | A |   | 6/2000  | Adelman et al. ........... 709/224 |
| 6,173,399 | B1 | * | 1/2001  | Gilbrech ..................... 713/153 |
| 6,226,685 | B1 | * | 5/2001  | Chen et al. .................. 709/238 |
| 6,266,335 | B1 | * | 7/2001  | Bhaskaran ................... 370/399 |
| 6,339,595 | B1 | * | 1/2002  | Rekhter et al. ............. 370/392 |
| 6,473,863 | B1 | * | 10/2002 | Genty et al. ................ 713/201 |
| 6,516,417 | B1 | * | 2/2003  | Pegrum et al. ............. 713/201 |
| 6,601,084 | B1 | * | 7/2003  | Bhaskaran et al. ......... 709/105 |
| 6,614,800 | B1 | * | 9/2003  | Genty et al. ................ 370/464 |
| 6,636,898 | B1 | * | 10/2003 | Ludovici et al. ............ 709/250 |

* cited by examiner

Primary Examiner—Zarni Maung
(74) Attorney, Agent, or Firm—David Volejnicek

(57) ABSTRACT

A VPN device clustering system connects two or more VPN devices on one side of a virtual private network to a similarly clustered system of two or more VPN devices on the other side of a virtual private network. The VPN device clustering system typically includes a plurality of clustering units for redundancy that avoids difficulties that arise with a single point of failure. For example two clustering units may be used in an active-passive high-availability configuration. A VPN device cluster creator creates or configures a VPN device cluster. To create a VPN device cluster, an administrator assigns to the cluster a logical Internet protocol (IP) address IPvpn and specifies VPN devices that are members of the cluster.

15 Claims, 4 Drawing Sheets

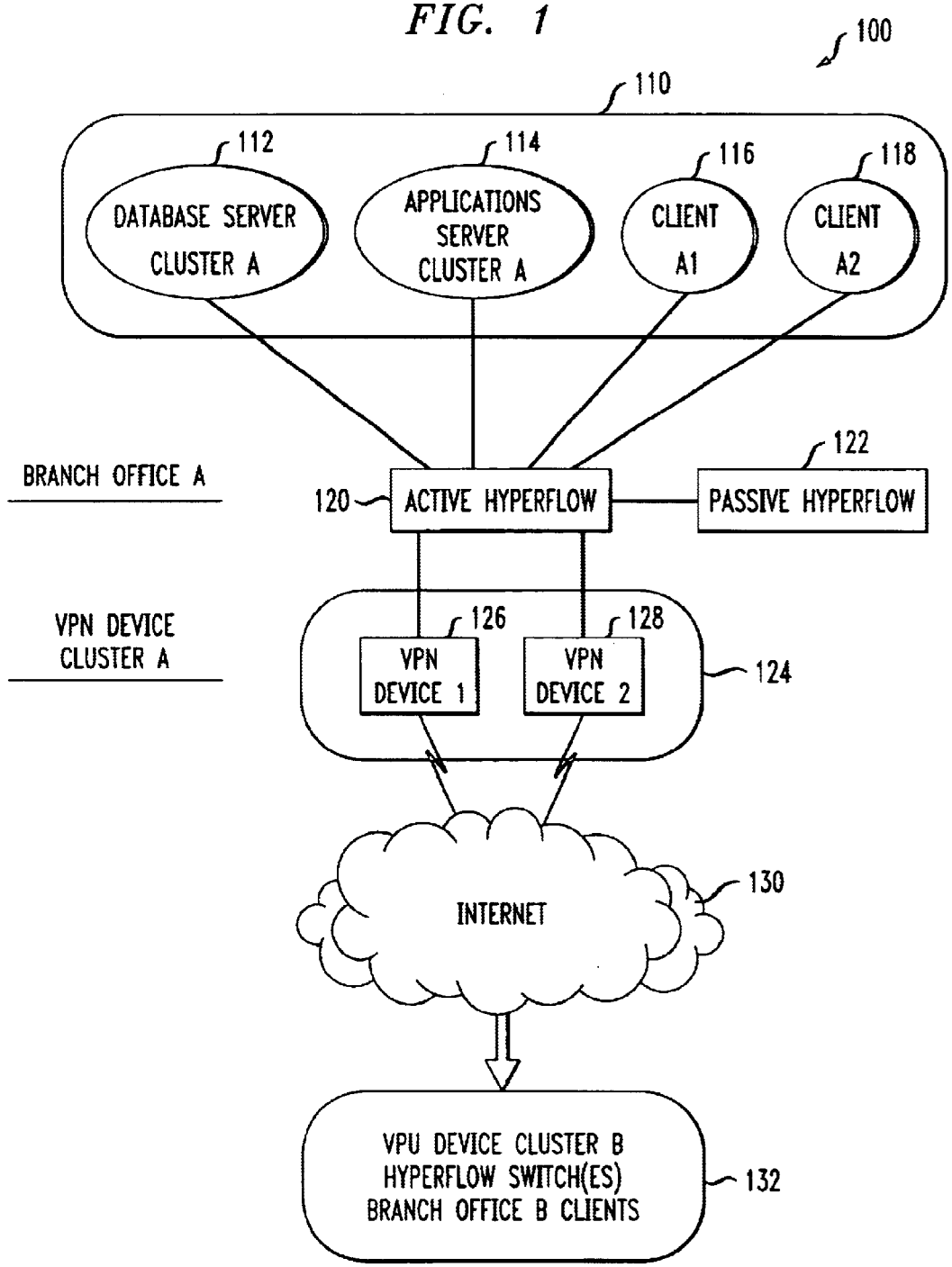

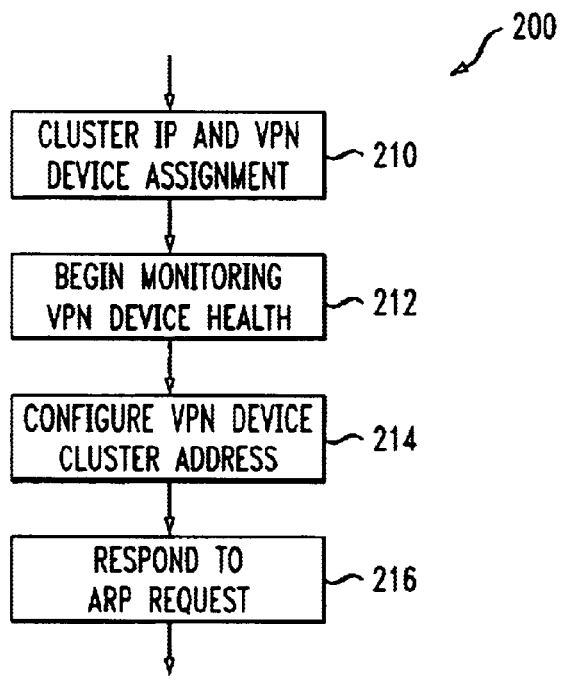
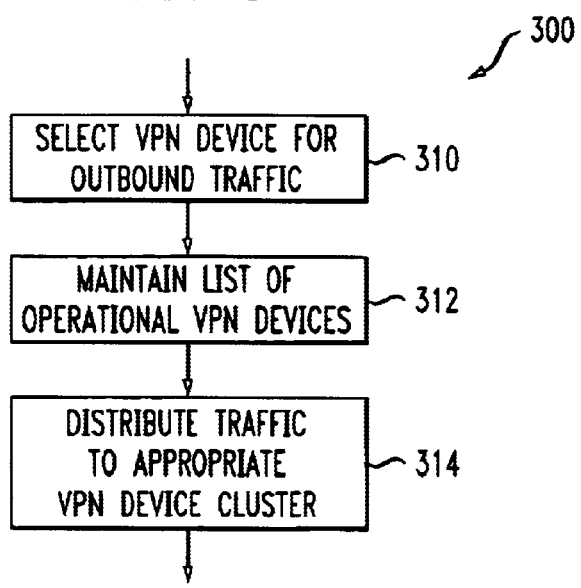

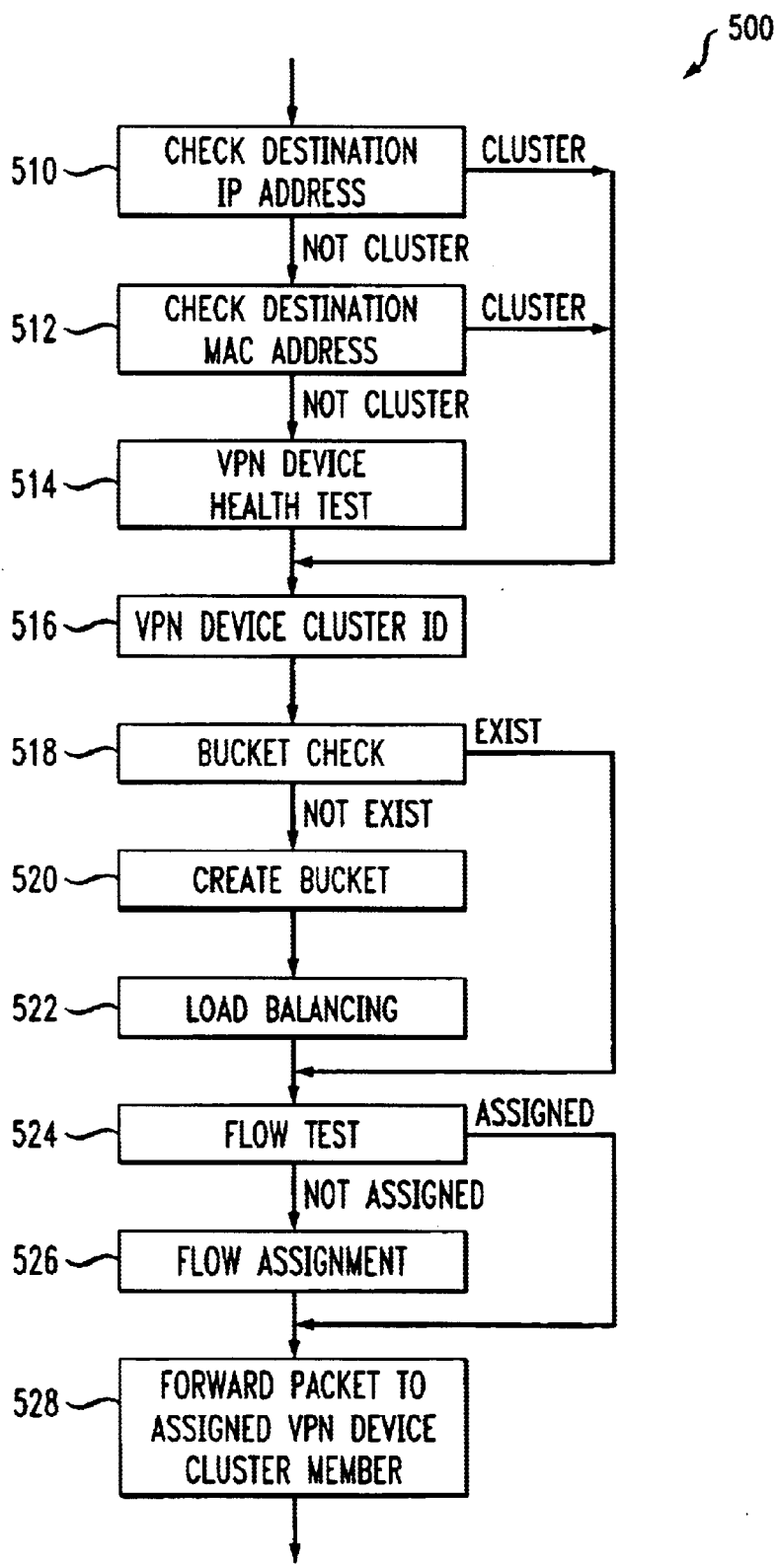

VPN DEVICE CLUSTERING USING A NETWORK FLOW SWITCH AND A DIFFERENT MAC ADDRESS FOR EACH VPN DEVICE IN THE CLUSTER

CROSS REFERENCE TO OTHER APPLICATIONS

U.S. Pat. No. 5,963,540, entitled "Router Pooling in a Network Flow Switch", discloses and claims router fault tolerance and router load balancing features used in the system of this invention. Co-pending application Ser. No. 08/994,709, now U.S. Pat. No. 6,266.335. entitled "Cross-Platform Server Clustering Using a Network Flow Switch", discloses and claims flow switch features used in the system of this invention. Co-pending application Ser. No. 08/992,038, now U.S. Pat. No. 6,601,084, "Dynamic Load Balancer for Multiple Network Servers", discloses and claims load balancing used in the system of this invention, Co-pending application Ser. No. 09/540,238, entitled "Firewall Pooling in a Network Flow Switch", discloses-and claims pooling used in the system of this invention. Co-pending application Ser. No. 09/540,296, entitled "Router Clustering for Multiple Network Servers", discloses and claims pooling and traffic distribution used in the system of this invention. Co-pending application Ser. No. 09/540,297, entitled "Firewall Clustering for Multiple Network Servers", discloses and claims data packet distribution used in the system of this invention. All cited applications are incorporated herein by reference in their entirety.

CROSS REFERENCE TO APPENDIX

Appendix A of the co-pending application Ser. No. 09/540,296, entitled "Router Clustering for Multiple Network Servers", with modifications that can be implemented by one skilled in the art based on this disclosure, is a listing of software code for embodiments of the present invention. The referenced Appendix A is incorporated herein.

BACKGROUND OF THE INVENTION

1. Field of the Invention

The present invention relates generally to computer networks and more specifically, to virtual private networks.

2. Description of the Related Art

Computer networking is a widespread and constantly expanding approach to the sharing of data and software among users with a common interest in such resources. Virtually every business, governmental, or other organization with more than a very few computers has those computers networked so that individual workstations can share the resources of one or more common processors or servers. Within a single building or a relatively small geographic area, the network computers can be connected through some form of Local Area Network (LAN).

There is an increasing need for remote access capability between computers and computer networks over larger and larger geographic areas. It is essential for companies with branch offices to have the capability to share computer resources between offices. As more and more employees do substantial work from home, or as they travel away from company offices, there is a need to provide them with access to the company's computer network with minimal inconvenience while still providing security for data access and transfer. Companies may be in partnership with other companies where there is a desire to share at least some computer resources. It may be expensive, difficult, and perhaps even impossible to network such far-flung computers using traditional approaches.

One solution to the problem of interconnecting remote computers is the use of owned or leased telecommunications lines dedicated to the sole use of a single company to service its remote computing sites. This technique, called a Wide Area Network (WAN), can be expensive depending upon how far and how extensively the lines need to run, and is wasteful of resources since the telecommunications lines may have relatively limited use or, correlatively, substantial unused capacity. In addition, there may be considerable organizational overhead associated with the establishment, expansion, maintenance, and administration of the WAN.

The concept of a virtual private network (VPN) has been developed to satisfy the need for lower cost, efficient networking of dispersed computers. A virtual private network is a private data network that makes use of the public telecommunications infrastructure, maintaining privacy through the use of a tunneling protocol and security procedure. VPNs extend the corporate network out to distant offices, home workers, salespeople, and business partners. VPNs use worldwide IP network services, including thee Internet service provider's backbones. Remote users can make a local Internet call instead of dialing in at long distance rates. Alternatively, other types of public network connections can be used, such as a frame relay.

One of the keys to a VPN system is its ability to "tunnel" through public telecommunications lines so that data or applications are passed only between authorized users. Tunnels are virtual point-to-point connections that offer authentication, encryption, and access control between tunnel endpoints. Tunnels can exist at several protocol layers. Also called "encapsulation," tunneling or "IP Tunneling" encloses one type of data packet into the packet of another protocol, usually TCP/IP. With VPN tunneling, before encapsulation takes place, the packets are encrypted so the data is unreadable to outsiders. The encapsulated packets travel through the internet until they reach their intended destination, then they are separated and returned to their original format. Authentication technology is employed to make sure the client has authorization to contact the server.

VPNs may be either hardware or software based. A hardware based system consists of a dedicated processor running any of a number of commercially available or proprietary VPN software packages that perform the necessary VPN functions, such as encryption/decryption and authentication. Hardware based systems are most appropriate for larger firms because they offer tighter security, and the ability to handle larger volumes of traffic with a dedicated VPN processor. To process even larger volumes of traffic, with greater speed, scalability, redundancy, and reliability, large VPN users can employ multiple VPN devices.

SUMMARY OF THE INVENTION

The present invention provides a VPN network flow switch and a method of operation thereof for connecting two or more VPN devices on one side of a virtual private network (VPN) to the authorized servers or users at that network site. A similar clustering arrangement is provided on the other side of the VPN. The clustered VPN devices share a single IP address, without requiring translation of the IP address, and providing bi-directional clustering. The clustering unit, by operating transparently at the ISO layers 2 and 3, enables cross-platform clustering of VPN devices. This means the VPN devices within any single cluster can come from any manufacturer of such hardware or software.

The VPN device clustering system typically includes a plurality of clustering units for redundancy to avoid difficulties that arise with a single point of failure. For example, two clustering units may be used in an active-passive high-availability configuration.

The clustering system operates on outgoing data packets before they go through the transmitting VPN device. Similarly, the clustering system operates on incoming data packets after processing by the VPN device. Thus, the VPN device clustering system operates in a manner that is independent of the VPN hardware and software. The clustering system can therefore operate with any VPN hardware or sofware configuration without affecting the VPN authentication, security, or "tunneling" functions.

In some embodiments, the VPN network flow switch, in addition to routing of the packets, performs load balancing and fault tolerance functions. In these embodiments, a processor of the VPN network flow switch periodically executes a load balancing routine to determine the relative workload of each of the VPN devices. When the VPN network flow switch receives a packet destined to the cluster of VPN devices, the packet is routed to the VPN device with an optimal workload, so as to ensure that the workload is evenly distributed among the VPN devices. In addition, if a failure of a VPN device is detected, a packet addressed to that VPN device is re-routed to a different VPN device by re-writing the Data Link Layer (MAC) destination address of the packet. Since the VPN network flow switch continuously monitors the status of the VPN devices, no lengthy time delay is introduced in point-to-point communications when a VPN device is disabled.

Since the cluster IP header is not modified, the VPN network flow switch of the present invention operates on packets encoded according to any VPN protocol. In addition, the VPN network flow switch can handle re-routing, load balancing and fault tolerance of encrypted packets transparently to users on both sides of the VPN.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

FIG. 1 is a schematic block diagram that illustrates an embodiment of a VPN device clustering system connecting two or more VPN devices on one side of a virtual private network to a similar VPN device clustering system on the other side of the virtual private network.

FIG. 2 is a schematic flow chart that depicts operations of a VPN device cluster creator.

FIG. 3 is a schematic flow diagram showing operations of a traffic distributor.

FIG. 5 is a flow diagram that illustrates a further implementation of a traffic distribution method.

DETAILED DESCRIPTION OF THE INVENTION

Figure 4:
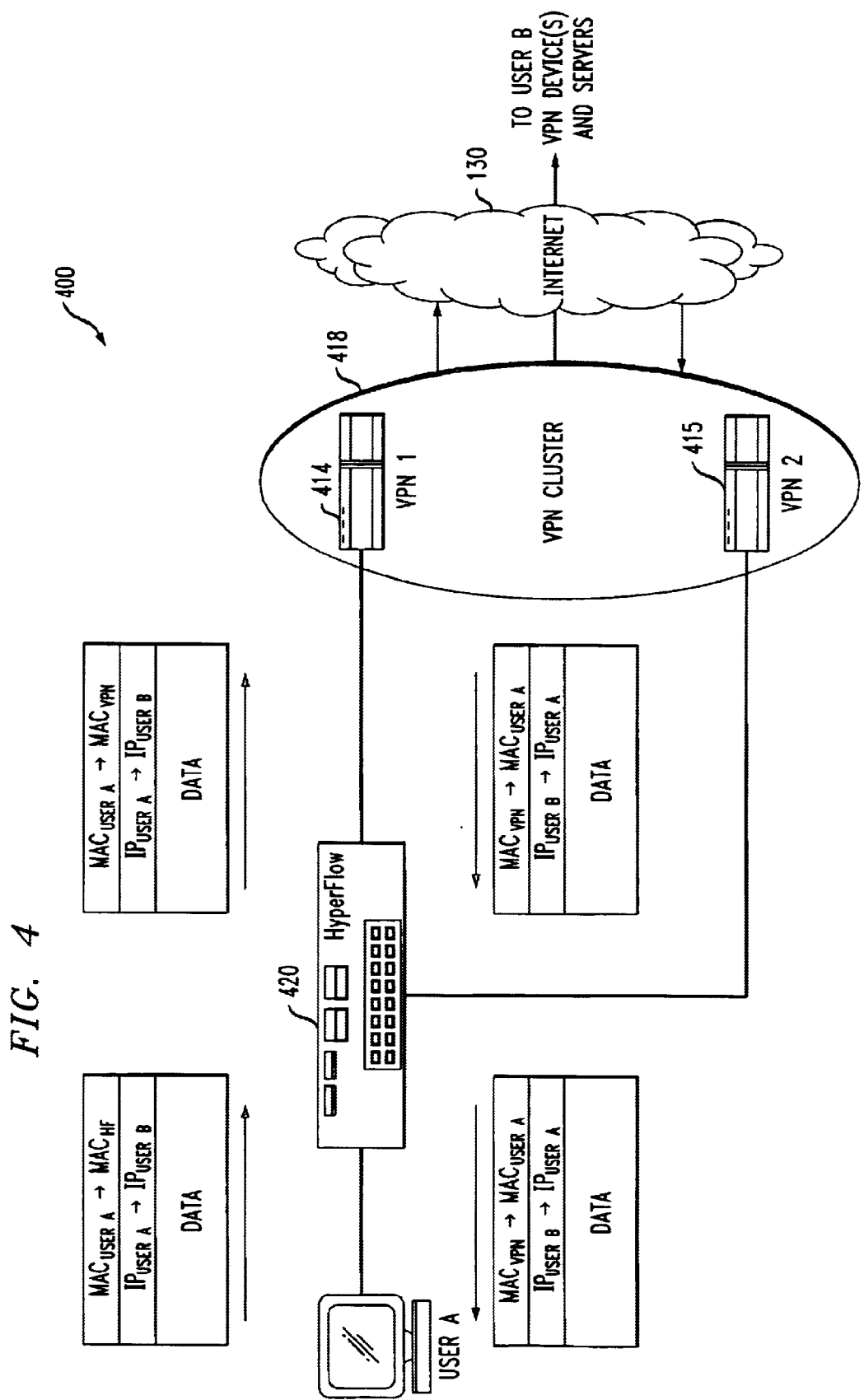
FIG. 4 is a schematic block diagram and associated transition tables that illustrate a technique for transferring a packet between two authorized users with a VPN device clustering system.

Referring to FIG. 1, a schematic block diagram illustrates an embodiment of a VPN device clustering system 100 that connects two or more VPN devices, for example VPN device1 126 and VPN device2 128, to the Internet 130 in an arrangement with complete high-availability, scalability, and traffic distribution. Although not illustrated in detail, it is to be understood that on the other side of the Internet 130 from the components shown in detail in FIG. 1 is located a similar configuration of VPN devices, clustering units, and peer-to-peer devices 132. In the illustrative VPN device clustering system 100, a network flow controller 120, or "hyperflow," includes a processor (not shown) and storage (not shown) that execute special-purpose software for control of the network flow controller 120. The network flow controller 120 arranges the two or more VPN devices, VPN device1 126 and VPN device2 128, in a VPN device cluster 124 to connect to the other end of a VPN "tunnel" through the Internet 130. The network flow controller 120 also arranges the branch office servers and other client devices 112, 114, 116, 118 in a cluster 110 on one side of the VPN tunnel for secure communication with similar peer devices at the other end of the VPN tunnel.

The VPN device clustering system 100 includes a plurality of clustering units, 120 and 122, which operate as an active flow controller 120 and a passive flow controller 122, for redundancy that avoids difficulties that arise with a single point of failure. The network flow controller 120 and the passive flow controller 122 are used in an active-passive high-availability configuration.

Outgoing traffic from the branch office (or client) A cluster 110 that is destined for branch office (or client) B cluster devices (included in 132) on the Internet 130 is distributed among the two or more VPN devices, VPN device1 126 and VPN device2 128. The VPN device clustering system 100 distributes traffic based on the destination cluster IP address of the packet, supporting all IP-based protocols. A single cluster IP address is assigned to all VPN devices in the respective (client A or client B) clusters.

Additional VPN devices may be seamlessly added to the cluster 124 to supply additional bandwidth and greater fault tolerance.

The network flow controller 120 operates independently of the hardware and software that are arranged in the VPN device clusters. For example, various combinations of VPN devices can exist in the cluster 124 as long as the VPN devices have the same connectivity.

The VPN device clustering system 100 includes multiple control processes that execute on the network flow controller 120 and the passive flow controller 122. One control process is a VPN device cluster creator that creates or configures the VPN device cluster 124.

FIG. 2, best understood in conjunction with FIG. 1, is a schematic flow chart depicting operations of a VPN device cluster creator software routine 200. To create the VPN device cluster 124, in a cluster IP and VPN device assignment operation 210, an administrator assigns to the cluster a logical Internet protocol (IP) address IPvpn and specifies VPN devices, for example VPN device1 126 and VPN device2 128, that are members of the VPN device cluster 124. In a begin monitoring VPN device health operation 212, the network flow controller 120 begins to monitor health of the VPN devices, VPN device1 126 and VPN device2 128, typically using a health check operation at a configured polling interval. In a configure VPN device cluster address operation 214, the logical cluster address IPvpn is configured on the client A devices 110.

In a respond to ARP request operation 216, the network flow controller 120 responds to an Address Resolution Protocol (ARP) request from the servers in the client A device cluster 110 to identify a Media Access Control (MAC) address associated with the VPN device cluster 124. Associating the MAC address with the VPN device cluster 124 ensures that the client A devices 110 send all outbound traffic to the VPN device cluster 124 for forwarding on to the corresponding VPN device cluster on the Internet 130.

Another control process is a traffic distributor that distributes outbound traffic destined for the Internet 130 among the VPN devices, for example, VPN device1 126 and VPN device2 128. Referring to FIG. 3 in combination with FIG. 1, a schematic flow diagram shows operations of a traffic distributor 300. The traffic distributor executes from the network flow controller 120. The traffic distributor 300, in a select VPN device for outbound traffic operation 310, determines which VPN device is to forward the outbound traffic based on the packet destination IP address, which will be the cluster IP address of the corresponding VPN device cluster at the receiving end of the VPN "tunnel". Usage of the destination cluster IP address ensures that, for a given flow designating a particular VPN tunnel connection, the same VPN device is used for every outbound packet so long as the VPN device remains operational. Since flow is based on the destination cluster IP address, measurement and analysis operations by the network flow controller 120 are reduced since measurements of parameters such as load on the VPN device is not necessary. Accordingly, VPN device load sharing is on a probabilistic or statistical basis, which may result is slightly unbalanced loading. The probabilistic loading presumes that VPN devices in the VPN device cluster 124 have similar forwarding power.

Internally, in a maintain list of operational VPN devices operation 312 the traffic distributor 300 maintains a list of operational VPN devices. Fields from the packet are used to compute the index into this list, identifying the active VPN devices. In a distribute traffic to appropriate VPN device cluster operation 314, traffic is directed to the appropriate peer VPN cluster based on that cluster's assigned IP address.

The network flow controller 120 has a particular MAC address that identifies the traffic distributor. The traffic distributor replaces the packet destination MAC address, which previous to replacement is the MAC address of the traffic distributor, with the MAC address of the VPN device handling the flow.

Each VPN device, VPN device1 126 or VPN device2 128, has an equal probability of assignment for an outbound flow forwarding since the traffic distributor uses only information in the packet IP header to select between VPN devices. Processing load or potential processing power of the VPN device is not analyzed as part of the selection process.

The VPN device cluster 124 does not affect the processing performed by the network flow controller 120 for inbound traffic coming from the Internet 130. Traffic destined for any VPN device cluster 124 continues to be distributed among the client A operational servers and other devices 110 defined in the VPN device cluster 124. At most only a single VPN device cluster 124 is supported for inbound traffic.

Another control process is a VPN device monitor that monitors "health" of the VPN devices. In some implementations, the VPN device clustering system 100 monitors VPN device health using a configured polling interval and health check method. The health probe authenticates connectivity of a flow across a VPN. In one example the network flow controller 120 periodically sends a Ping packet to VPN device1 126, using ICMP extension to confirm that the flow is operative. VPN device1 126 responds on the same port since there is a one-to-one correlation between VPN devices and individual ports of the network flow controller 120.

In some implementations, the VPN device clustering system 100 continually monitors the operational health of the VPN devices and associated wide area network (WAN) links.

In some implementations, the VPN device clustering system 100 detects one or more of various failure conditions. Failures can occur in the VPN device to LAN interface and link, or in the VPN device itself due to power outage, software malfunction, hardware malfunction, or other condition. Failures also can occur in the VPN device to WAN interface and link. When the VPN device clustering system 100 detects a failure, traffic is automatically forwarded to the remaining operational VPN device or devices. The VPN device clustering system does not require manual intervention at the client A servers to bypass the failed VPN devices.

Referring to FIG. 4, a schematic block diagram and associated transition tables depicts a technique for transferring a packet between a client A device 410 and a client B device (not shown) that is assigned to use VPN device1 414 by the VPN device clustering system. The outbound traffic 416 has a destination MAC address designating the MAC address of the traffic distributor, but has a destination IP address that designates neither the traffic distributor nor any cluster supported by the traffic distributor. VPN device cluster traffic has no unique attribute other than destination VPN cluster IP address so that designation of the destination IP address effectively limits the current traffic distributor to support only a single VPN device cluster 418. Although only a single VPN device cluster 418 is included in the VPN device clustering system 400, the VPN device cluster 418 typically includes a plurality of VPN devices, here shown as VPN device1 414 and VPN device2 415.

The limitation to a single VPN device cluster 418 further extends to limit the VPN device clustering system 400 to a single cluster that performs a routing function.

Other implementations of a VPN device clustering system that supports multiple MAC addresses can support additional VPN device clusters.

The cluster IP address of the VPN device cluster 418 does not appear in the packet since the VPN device cluster 418 is only a gateway on the path to an actual end destination.

A network flow controller 420 uses ARP probe methods to monitor the VPN devices in the VPN device cluster 418. Software executing in the network flow controller 420 uses the Address Resolution Protocol (ARP) to probe for an unused IP address. If a VPN device responds to the ARP probe, the software tries the next IP address. If, after several tries, no response is elicited from an ARP probe, software uses that address as the IP address of the VPN device.

Referring to FIG. 5, a flow diagram illustrates a traffic distribution method 500. In a check destination IP address operation 510, a traffic distributor checks the destination IP address of a packet to determine whether the destination IP address is a cluster address.

If the check destination IP address operation 510 determines that the destination IP address is not a cluster address then, in a test destination MAC address operation 512, the traffic distributor checks to determine whether the destination MAC address is a cluster address. The destination MAC address matches the cluster address when a Proxy ARP is used to indicate to attached VPN devices that the MAC address of the network flow controller is used when sending packets to any of the configured cluster IP addresses.

If the test destination MAC address operation 512 determines that the MAC address is not a cluster address then, in a VPN health test operation 514, the traffic distributor performs a performance test on the VPN devices in the cluster.

A first redirection operation is a set VPN device cluster identifier operation 516 in which the cluster address in the form of either the MAC address or the destination IP address is set to identify the cluster data structure. A bucket check operation 518 determines whether at least one bucket exists in a cluster data structure. If not, one is created in a create bucket operation 520. A load balancing operation 522 retrieves an appropriate bucket that attains load balancing.

A flow test operation 524 determines whether the flow is assigned to the bucket and, if not, performs a flow assignment operation 526 that assigns buckets to a server. The traffic distributor executes a forward packet to assigned VPN device cluster member 532 with the buckets used to forward data requests from client A to client B.

Further details of a traffic distribution and load balancing system are disclosed and claimed in co-pending application Ser. No. 09/540,296, entitled "Router Clustering for Multiple Network Service", incorporated herein in full.

While the invention has been described with reference to various embodiments, it will be understood that these embodiments are illustrative and that the scope of the invention is not limited to them. Many variations, modifications, additions and improvements of the embodiments described are possible. For example, those skilled in the art will readily implement the steps necessary to provide the structures and methods disclosed herein, and will understand that the process parameters, materials, and dimensions are given by way of example only and can be varied to achieve the desired structure as well as modifications which are within the scope of the invention. Variations and modifications of the embodiments disclosed herein may be made based on the description set forth herein, without departing from the scope and spirit of the invention as set forth in the following claims.

In the claims, unless otherwise indicated the article "a" is to refer to "one or more than one".

What is claimed is:

1. A method of routing message traffic on a virtual private network (VPN) between a first plurality of users and a second plurality of users, the method comprising:
    creating a cluster containing a plurality of VPN devices each having a different Media Access Control (MAC) address, the cluster being addressed by a logical Internet protocol (IP) address that is distinct from the unique IP addresses of VPN devices contained within the cluster; and
    distributing traffic between the first plurality of users and the second plurality of users via a VPN device selected from among the VPN devices contained in the cluster, the VPN device being selected on the basis of both a packet destination IP address and a VPN device MAC address.

2. A method according to claim 1, wherein the creating operation further comprises:
    assigning a single MAC address to the VPN device cluster; wherein
        distributing traffic comprises;
            replacing the single MAC address of traffic addressed to the single MAC address with the MAC address of the selected VPN device.

3. A method according to claim 1 wherein the creating operation further comprises:
    assigning a unique MAC address to each VPN device cluster of a plurality of VPN device clusters; wherein distributing traffic comprises
        selecting one of the VPN device clusters on the basis of the packet destination IP address, and
        replacing the unique MAC address of traffic addressed to the unique MAC address of the selected VPN device cluster with the MAC address of the selected VPN device of the selected VPN device cluster.

4. A method according to claim 1 wherein the creating operation further comprises:
    assigning a different said logical IP address to each VPN device cluster; and
    distributing traffic comprises
        selecting a VPN device cluster to forward the traffic based on a destination cluster IP address of the traffic.

5. A method according to claim 1 further comprising:
    monitoring the operational health of the VPN devices, and
    in response to detecting failure of a VPN device in a cluster, rewriting a MAC destination address of traffic addressed to the failed VPN device with the MAC address of another VPN device in same said cluster.

6. A method according to claim 1 wherein the distributing traffic operation further comprises:
    selecting a VPN device from among the plurality of VPN devices contained within the cluster for distributing outbound traffic from one VPN user to another VPN user, based on the packet IP destination address and a VPN device MAC address to select the cluster and to effect traffic-load balancing among the VPN devices contained in the cluster.

7. A method according to claim 1 wherein the distributing traffic operation further comprises:
    selecting a VPN device from among the plurality of VPN devices contained within the cluster for distributing outbound traffic from one VPN user to another VPN user so that for any given VPN user-to-user connection flow the same VPN device is used for every outbound packet so long as the flow remains operational.

8. A method according to claim 1 wherein the distributing traffic operation further comprises:
    selecting a VPN device from among the plurality of VPN devices contained within the cluster for distributing outbound traffic from one VPN user to another VPN user so that the probability of any particular VPN device being selected for a VPN user-to-user connection flow forwarding is the same.

9. A computer readable storage medium comprising an encoding for execution on a processor for routing message traffic on a virtual private network (VPN) between a first plurality of users and a second plurality of users via VPN devices, the medium comprising:
    the encoding defining
    a cluster containing a plurality of VPN devices, the cluster being addressed by a logical Internet protocol (IP) address that is distinct from the unique IP addresses of VPN devices contained within the cluster;
    a list of the VPN devices contained within the cluster and their respective unique Media Access Control (MAC) addresses; and
    a redirecting VPN device adapted for redirecting traffic from an active VPN device of the cluster to another VPN device of the cluster when the active VPN device fails, by rewriting a MAC address of traffic addressed to the failed active VPN device with the MAC address of the other VPN device in a same said cluster.

10. A computer readable storage medium according to claim 9 further comprising:

the encoding defining a traffic distributor that is adapted to distribute traffic between a user of the first plurality of VPN users and a user of the second plurality of VPN users via a VPN device selected from among the VPN devices contained in the cluster, the VPN device being selected on the basis of both a packet destination IP address and a VPN device MAC address.

11. A computer readable storage medium comprising an encoding for execution on a processor for routing message traffic on a virtual private network (VPN) between a first plurality of users and a second plurality of users via VPN devices, the medium comprising:

the encoding defining a cluster containing a plurality of VPN devices each having a different Media Access Control (MAC) address, the clustered being addressed by a logical Internet protocol (IP) address that is distinct from the unique IP addresses of VPN devices contained within the cluster; and a traffic distributor that is adapted to distribute traffic between the first plurality of users and the second plurality of users via a VPM device selected from, among the VPN devices contained in the cluster on the basis of both a packet destination IP address and a VPN device MAC address.

12. A computer readable storage medium according to claim 11 comprising:

the encoding further defining a list of the VPN devices contained within the cluster and their respective unique MAC addresses; and a redirecting VPN device adapted or redirecting traffic from an active VPN device of the cluster to another VPN device of the cluster when the active VPN device fails, by changing a MAC address of traffic addressed to the failed active VPN device to the MAC address of the other VPN device in a same said cluster.

13. A computer readable storage medium according to claim 12 further comprising:

a single MAC address assigned to the cluster; and the encoding defining a traffic distributor adapted to replace the single MAC address of traffic addressed to the single MAC address with a MAC address of whichever VPN device of the cluster is selected to transmit said traffic.

14. A computer readable storage medium according to claim 12 further comprising:

a unique MAC address, assigned to each cluster of a plurality of clusters; and the encoding defining a traffic distributor that is adapted to select one of the VPN device clusters on the basis of a packet destination IP address and that is adapted to replace a MAC address of traffic addressed to the unique MAC address of the selected cluster with the MAC address of whichever VPN device of the selected cluster is selected to transmit said traffic.

15. A computer readable storage medium according to claim 12 further comprising:

the encoding defining an operational health probe manager that is adapted to determine health of the VPN devices in the cluster, and to rewrite a MAC destination address of traffic addressed to a failed VPN device in the cluster with the MAC address of another VPN device in same said cluster in response to detecting failure of the failed VPN device.

\* \* \* \* \*